United States Patent
Kim et al.

(10) Patent No.: US 12,412,247 B2
(45) Date of Patent: Sep. 9, 2025

(54) EFFICIENT FLICKER SUPPRESSION FOR SINGLE IMAGE SUPER-RESOLUTION

(71) Applicant: SAMSUNG ELECTRONICS CO., LTD., Suwon-si (KR)

(72) Inventors: Joonsoo Kim, Irvine, CA (US); Tien Cheng Bau, Irvine, CA (US); Hrishikesh Deepak Garud, Irvine, CA (US); Kamal Jnawali, Tustin, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 17/820,203

(22) Filed: Aug. 16, 2022

(65) Prior Publication Data
US 2023/0095237 A1    Mar. 30, 2023

Related U.S. Application Data

(60) Provisional application No. 63/247,428, filed on Sep. 23, 2021.

(51) Int. Cl.
*G06T 5/00* (2024.01)
*G06T 5/50* (2006.01)
(Continued)

(52) U.S. Cl.
CPC .............. *G06T 5/00* (2013.01); *G06T 5/50* (2013.01); *G06T 7/248* (2017.01); *G06T 7/337* (2017.01); *G06T 2207/20212* (2013.01)

(58) Field of Classification Search
CPC .. G06T 5/00; G06T 5/50; G06T 7/248; G06T 7/337; G06T 2207/20212; G06T 2207/20182; G06T 3/4053
See application file for complete search history.

(56) References Cited

U.S. PATENT DOCUMENTS

| 8,345,158 B2 | 1/2013 | Robertson et al. |
| 8,582,654 B1 * | 11/2013 | Patti .................. H04N 19/86 |
| | | 375/240.12 |

(Continued)

FOREIGN PATENT DOCUMENTS

| KR | 20100114068 A | 10/2010 | |
| WO | WO-2013128010 A2 * | 9/2013 | ............... G06T 9/00 |
| WO | WO-2019087905 A1 * | 5/2019 | |

OTHER PUBLICATIONS

Lu et al. (2020). Deep Plug-and-Play Video Super-Resolution. In: Bartoli, A., Fusiello, A. (eds) Computer Vision—ECCV 2020 Workshops. ECCV 2020. Lecture Notes in Computer Science(), vol. 12538. Springer, Cham. (Year: 2020).*

(Continued)

*Primary Examiner* — Emily C Terrell
*Assistant Examiner* — Julia Z. Yao
(74) *Attorney, Agent, or Firm* — Sherman IP LLP; Kenneth L. Sherman; Hemavathy Perumal

(57) ABSTRACT

One embodiment provides a method comprising receiving an input video comprising low-resolution (LR) frames and corresponding super-resolution (SR) frames, and generating a motion-compensated previous SR frame based on a current LR frame of the video and a motion-compensated previous residual frame of the video. The previous SR frame aligns with a current SR frame corresponding to the current LR frame. The method further comprises, in response to determining there is a mismatch between the previous SR frame and the current SR frame, correcting in the current SR frame errors that result from motion compensation based on the motion-compensated previous SR frame. The method further comprises restoring details to the current SR frame that were lost as a result of the correcting, and suppressing flickers of the current SR frame on the frequency domain, (Continued)

resulting in a flicker-suppressed current SR frame for presentation on a display.

20 Claims, 8 Drawing Sheets
(4 of 8 Drawing Sheet(s) Filed in Color)

(51) Int. Cl.
  *G06T 7/246* (2017.01)
  *G06T 7/33* (2017.01)

(56) References Cited

U.S. PATENT DOCUMENTS

| | | | |
|---|---|---|---|
| 8,731,062 B2 | 5/2014 | Kanumuri et al. | |
| 2003/0035478 A1* | 2/2003 | Taubman | H04N 19/61 375/E7.092 |
| 2008/0013630 A1* | 1/2008 | Li | H04N 19/523 375/E7.113 |
| 2009/0195697 A1 | 8/2009 | Kanumuri et al. | |
| 2009/0238535 A1* | 9/2009 | Robertson | G06T 3/4053 386/335 |
| 2012/0051432 A1* | 3/2012 | Fernandes | H04N 19/172 375/E7.125 |
| 2012/0081571 A1 | 4/2012 | Jang et al. | |
| 2015/0093015 A1* | 4/2015 | Liang | G06F 18/24 382/154 |
| 2015/0326881 A1* | 11/2015 | Ikai | H04N 19/176 375/240.12 |
| 2019/0045192 A1* | 2/2019 | Socek | H04N 19/573 |
| 2019/0130530 A1 | 5/2019 | Schroers et al. | |
| 2019/0149841 A1* | 5/2019 | Mukherjee | H04N 19/527 375/240.16 |
| 2019/0206026 A1 | 7/2019 | Vemulapalli et al. | |
| 2020/0145697 A1* | 5/2020 | Zhang | H04N 19/61 |
| 2020/0294217 A1 | 9/2020 | El-Khamy et al. | |
| 2020/0314316 A1 | 10/2020 | Hagenburg | |
| 2020/0374524 A1* | 11/2020 | Gao | H04N 19/105 |
| 2021/0073944 A1 | 3/2021 | Liu et al. | |
| 2021/0099722 A1* | 4/2021 | Da Silva Pratas Gabriel | H04N 19/184 |
| 2021/0224951 A1 | 7/2021 | Ahn et al. | |
| 2021/0239863 A1 | 8/2021 | Tavitian et al. | |
| 2021/0256670 A1 | 8/2021 | Woodall et al. | |
| 2024/0137518 A1* | 4/2024 | Lin | H04N 19/186 |

OTHER PUBLICATIONS

Dugad et al., "A scheme for spatial scalability using nonscalable encoders," in IEEE Transactions on Circuits and Systems for Video Technology, vol. 13, No. 10, pp. 993-999, Oct. 2003, doi: 10.1109/TCSVT.2003.816519. (Year: 2003).*

Wen, W. et al., "Video Super-Resolution via a Spatio-Temporal Alignment Network", IEEE Transactions on Image Processing, Feb. 1, 2022, pp. 1761-1773, IEEE, United States.

Kanumuri, S. et al., "Temporal Flicker Reduction and Denoising in Video using Sparse Directional Transforms", Applications of Digital Image Processing XXXI, Sep. 13, 2008, pp. 173-183, vol. 7073, United States.

Xu, Z-Q et al., "Super-Resolution Reconstruction of Compressed Video based on Various Noise Models", Journal of Information Technology and Engineering, Jun. 2018, pp. 1-7, vol. 3, No. 1.

Symolon, W. et al., "Single-Image Super Resolution Using Convolutional Neural Network", Procedia Computer Science, 2021, p. 213-222, Science Direct, United States.

Kuszpet, Y. et al., "Post-processing for flicker reduction in H. 264/AVC", In Picture Coding Symposium, 2007, pp. 1-4, United States.

Yan, B. et al., "Frame and feature-context video super-resolution." Proceedings of the 33rd AAAI Conference on Artificial Intelligence, Jul. 17, 2019, pp. 5597-5604, vol. 33. No. 01, United States.

Sajjadi, M. et al., "Frame-recurrent video super-resolution", In Proceedings of the IEEE Conference on Computer Vision and Pattern Recognition, 2018, pp. 6626-6634, IEEE, United States.

Chu, M., et al., "Learning temporal coherence via self-supervision for GAN-based video generation", ACM Transactions on Graphics (TOG), Jul. 8, 2020, p. 75:1-75:13 & 75:1-75:6, vol. 39, No. 4, United States.

International Search Report and Written Opinion dated Dec. 27, 2022 for International Application PCT/KR2022/013725, from Korean Intellectual Property Office, pp. 1-10, Republic of Korea.

* cited by examiner

Upsampled LR Frame $lr_{up}^t$

Final SR Frame $sr_{final}^t$ Without Motion Error Correction

SR Frame $sr^t$

Final SR Frame $sr_{final}^t$ With Motion Error Correction

EFFICIENT FLICKER SUPPRESSION FOR SINGLE IMAGE SUPER-RESOLUTION

CROSS-REFERENCE TO RELATED APPLICATIONS

The present application claims priority to U.S. Provisional Patent Application No. 63/247,428, filed on Sep. 23, 2021, incorporated by reference in its entirety.

TECHNICAL FIELD

One or more embodiments generally relate to flicker suppression, in particular, efficient flicker suppression for single image super-resolution (SR).

BACKGROUND

Super-resolution (SR) is an image processing method that involves enhancing (i.e., increasing) the resolution of an image. For example, deep learning-based single image SR (SISR) obtains a high-resolution (HR) image from a low-resolution (LR) image.

SUMMARY

One embodiment provides a method comprising receiving an input video comprising low-resolution (LR) frames and super-resolution (SR) frames corresponding to the LR frames. The method further comprises generating a motion-compensated previous SR frame based on a current LR frame of the input video and a motion-compensated previous residual frame of the input video. The motion-compensated previous SR frame aligns with a current SR frame corresponding to the current LR frame. The method further comprises, in response to determining there is a mismatch between the motion-compensated previous SR frame and the current SR frame, correcting in the current SR frame one or more errors that result from motion compensation based on the motion-compensated previous SR frame. The method further comprises restoring one or more details to the current SR frame that were lost as a result of the correcting, and suppressing one or more flickers of the current SR frame on the frequency domain, resulting in a flicker-suppressed current SR frame for presentation on a display.

Another embodiment provides a system comprising at least one processor and a non-transitory processor-readable memory device storing instructions that when executed by the at least one processor causes the at least one processor to perform operations. The operations include receiving an input video comprising LR frames and SR frames corresponding to the LR frames. The operations further include generating a motion-compensated previous SR frame based on a current LR frame of the input video and a motion-compensated previous residual frame of the input video. The motion-compensated previous SR frame aligns with a current SR frame corresponding to the current LR frame. The operations further include, in response to determining there is a mismatch between the motion-compensated previous SR frame and the current SR frame, correcting in the current SR frame one or more errors that result from motion compensation based on the motion-compensated previous SR frame. The operations further include restoring one or more details to the current SR frame that were lost as a result of the correcting, and suppressing one or more flickers of the current SR frame on the frequency domain, resulting in a flicker-suppressed current SR frame for presentation on a display.

One embodiment provides a non-transitory processor-readable medium that includes a program that when executed by a processor performs a method comprising receiving an input video comprising LR frames and SR frames corresponding to the LR frames. The method further comprises generating a motion-compensated previous SR frame based on a current LR frame of the input video and a motion-compensated previous residual frame of the input video. The motion-compensated previous SR frame aligns with a current SR frame corresponding to the current LR frame. The method further comprises, in response to determining there is a mismatch between the motion-compensated previous SR frame and the current SR frame, correcting in the current SR frame one or more errors that result from motion compensation based on the motion-compensated previous SR frame. The method further comprises restoring one or more details to the current SR frame that were lost as a result of the correcting, and suppressing one or more flickers of the current SR frame on the frequency domain, resulting in a flicker-suppressed current SR frame for presentation on a display.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which.

DETAILED DESCRIPTION

Figure 1:
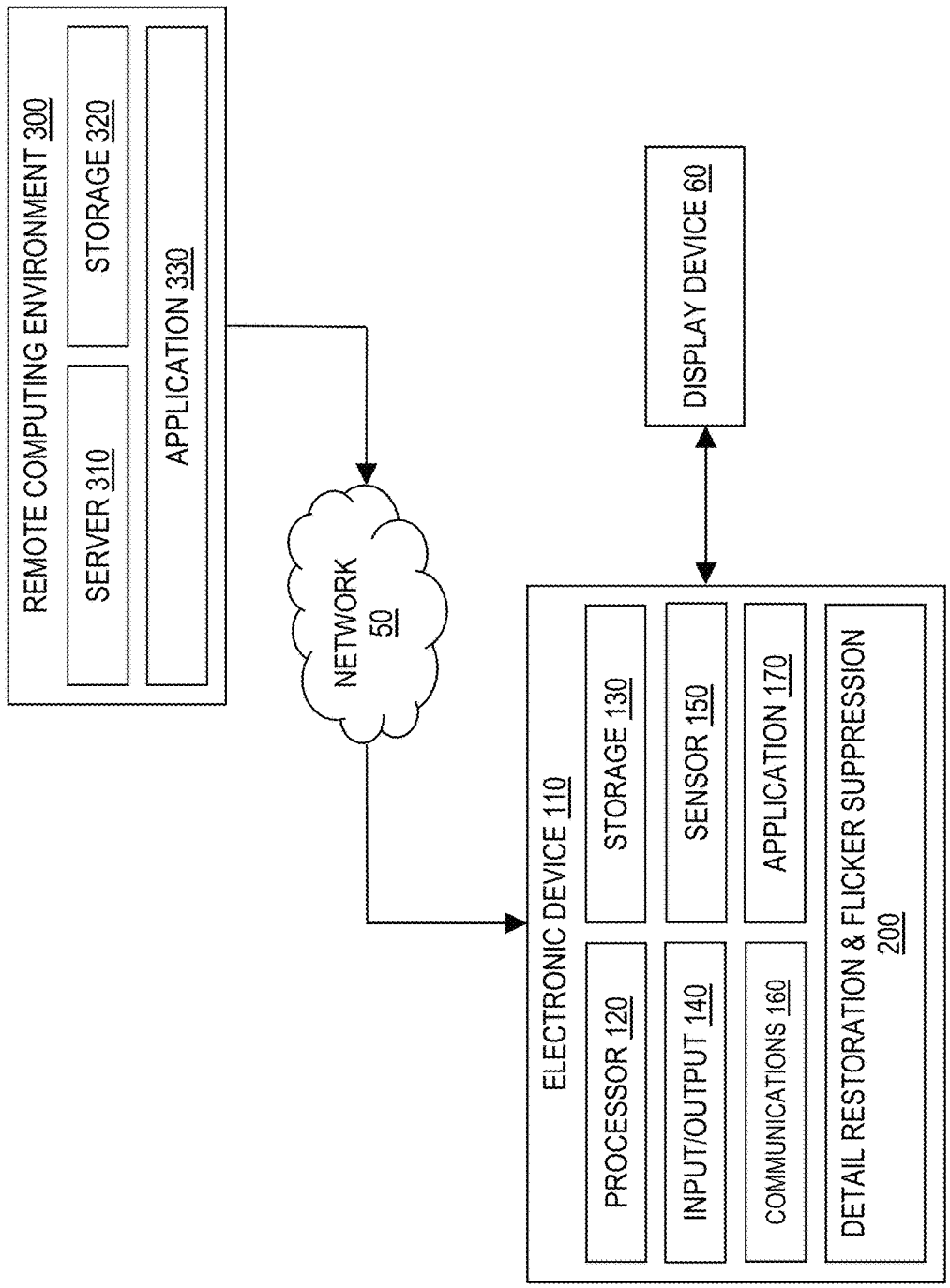
FIG. 1 illustrates an example computing architecture for implementing efficient flicker suppression for single image super-resolution (SR), in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to flicker suppression, in particular, efficient flicker suppression for single image super-resolution (SR). One embodiment provides a method comprising receiving an input video comprising low-resolution (LR) frames and SR frames corresponding to the LR frames. The method further comprises generating a motion-compensated previous SR frame based on a current LR frame of the input video and a motion-compensated previous residual frame of the input video. The motion-compensated previous SR frame aligns with a current SR frame corresponding to the current LR frame. The method further comprises, in response to determining there is a mismatch between the motion-compensated previous SR frame and the current SR frame, correcting in the current SR frame one or more errors that result from motion compensation based on the motion-compensated previous SR frame. The method further comprises restoring one or more details to the current SR frame that were lost as a result of the correcting, and suppressing one or more flickers of the current SR frame on the frequency domain, resulting in a flicker-suppressed current SR frame for presentation on a display.

Another embodiment provides a system comprising at least one processor and a non-transitory processor-readable memory device storing instructions that when executed by the at least one processor causes the at least one processor to perform operations. The operations include receiving an input video comprising LR frames and SR frames corresponding to the LR frames. The operations further include generating a motion-compensated previous SR frame based on a current LR frame of the input video and a motion-compensated previous residual frame of the input video. The motion-compensated previous SR frame aligns with a current SR frame corresponding to the current LR frame. The operations further include, in response to determining there is a mismatch between the motion-compensated previous SR frame and the current SR frame, correcting in the current SR frame one or more errors that result from motion compensation based on the motion-compensated previous SR frame. The operations further include restoring one or more details to the current SR frame that were lost as a result of the correcting, and suppressing one or more flickers of the current SR frame on the frequency domain, resulting in a flicker-suppressed current SR frame for presentation on a display.

One embodiment provides a non-transitory processor-readable medium that includes a program that when executed by a processor performs a method comprising receiving an input video comprising LR frames and SR frames corresponding to the LR frames. The method further comprises generating a motion-compensated previous SR frame based on a current LR frame of the input video and a motion-compensated previous residual frame of the input video. The motion-compensated previous SR frame aligns with a current SR frame corresponding to the current LR frame. The method further comprises, in response to determining there is a mismatch between the motion-compensated previous SR frame and the current SR frame, correcting in the current SR frame one or more errors that result from motion compensation based on the motion-compensated previous SR frame. The method further comprises restoring one or more details to the current SR frame that were lost as a result of the correcting, and suppressing one or more flickers of the current SR frame on the frequency domain, resulting in a flicker-suppressed current SR frame for presentation on a display.

For expository purposes, the terms "image" and "frame" are used interchangeably in this specification.

Examples of LR images include, but are not limited to, Standard Definition (SD) images, etc. Examples of HR images include, but are not limited to, High Definition (HD) images, 4K images (i.e., four times more pixels than HD), 8K images, etc.

Applying a deep learning-based single image SR (SISR) model to an input video may generate an output video with temporal artifacts such as flickering that significantly affects viewing experience of users. Conventional methods may be used to remove/suppress the flickering in the video. For example, motion compensation-based flicker suppression is a conventional method that uses a recursive approach to blending previous frames of a video with a current frame of the video. A blended frame resulting from the blending is then used as a previous frame that a next frame of the video is blended with. If a blended frame that is used as a previous frame include an error resulting from the motion compensation-based flicker suppression, the error will propagate when the blended frame is blended with the current frame or next frames of the video. Such an error may result in less flicker suppression, loss of details, and ghosting artifacts.

As another example, temporal filtering is a conventional method that involves blending previous frames of a video with a current frame of the video using a weighted sum, where motion compensation has already been applied to the previous frames ("motion-compensated previous frames"). The weighted sum is calculated based on pixel differences (spatial domain) between the current frame and the motion-compensated previous frames. Temporal filtering, however, may smooth out details of edges or textures. For example, if a motion-compensated previous frame is slightly misaligned with the current frame, temporal filtering will result in a large loss of details of edges or textures.

One or more embodiments provide a framework for flicker suppression in video that prevents propagation of errors resulting from motion compensation ("motion errors") to current and next frames of the video. Before detecting and suppressing flickers on the frequency domain, the framework provides correction of the motion errors ("motion error correction"). The motion error correction involves generating one or more motion-compensated previous SR frames that align with a current SR frame using a current LR frame (e.g., an SD image) and a motion-compensated previous residual frame, and correcting the motion errors by blending between the motion-compensated previous SR frames and the current SR frame if there is a small mismatch between these frames. Each SR frame is a HR frame (e.g., a 4K image).

Some details may be lost as a result of the motion error correction. After the motion error correction, the framework provides discrete cosine transform (DCT)-based detail restoration and flicker suppression that efficiently restores fine details (e.g., details of edges and textures) while suppressing flickers on the frequency domain. The DCT-based detail restoration and flicker suppression involves adjusting one or more tunable parameters.

Some conventional flicker suppression methods for SR include deep convolutional neural network-based video SR, where neural networks are trained for a long period of time on a large dataset of frames (i.e., large amount of training samples) to suppress flickers and keep fine details. If there is any flicker or detail loss, the neural networks are re-trained with an additional dataset of frames. Further, if there is any flicker as a result of using different scales in SR, the neural networks are re-trained on different datasets of frames for the different scales. By comparison, the framework is compatible with any SR method and with any scale used in SR. The framework works on any video that has a pair of frames comprising a LR frame and a corresponding SR frame. Further, as it is not learning-based, the framework does not require any training on a large dataset of frames. If there is any flicker or detail loss, one or more tunable parameters are adjusted/tuned via the framework.

FIG. 1 illustrates an example computing architecture 100 for implementing efficient flicker suppression for single image SR, in one or more embodiments. The computing architecture 100 comprises an electronic device 110 including resources, such as one or more processor units 120 and one or more storage units 130. One or more applications may execute/operate on the electronic device 110 utilizing the resources of the electronic device 110.

In one embodiment, the one or more applications on the electronic device 110 include a detail restoration and flicker suppression system 200 configured to provide in-device processing. In one embodiment, the in-device processing includes implementing efficient flicker suppression of content for presentation on a display device (e.g., a high dynamic range (HDR) rendering display) 60 integrated in or coupled to the electronic device 110. As described in detail later herein, the system 200 is configured to: (1) receive, as input, content (e.g., a HDR video) for presentation on the display device 60, (2) correct one or more motion errors occurring in one or more frames (e.g., frames) of the content, and (3) apply detail restoration and flicker suppression to the content, wherein resulting flicker-suppressed content is rendered on the display device 60. In one embodiment, the display device 60 is a consumer display for viewing.

Examples of an electronic device 110 that the display device 60 is integrated into or coupled to include, but are not limited to, a television (TV) (e.g., a smart TV), a mobile electronic device (e.g., an optimal frame rate tablet, a smart phone, a laptop, etc.), a wearable device (e.g., a smart watch, a smart band, a head-mounted display, smart glasses, etc.), a desktop computer, a gaming console, a video camera, a media playback device (e.g., a DVD player), a set-top box, an Internet of things (IoT) device, a cable box, a satellite receiver, etc.

In one embodiment, the electronic device 110 comprises one or more sensor units 150 integrated in or coupled to the electronic device 110. In one embodiment, the one or more sensor units 150 include, but are not limited to, a camera, a microphone, a GPS, a motion sensor, etc. In one embodiment, at least one of the sensor units 150 is integrated in (i.e., pre-installed) or coupled (attached) to the display device 60.

In one embodiment, the electronic device 110 comprises one or more input/output (I/O) units 140 integrated in or coupled to the electronic device 110. In one embodiment, the one or more I/O units 140 include, but are not limited to, a physical user interface (PUI) and/or a graphical user interface (GUI), such as a remote control, a keyboard, a keypad, a touch interface, a touch screen, a knob, a button, a display screen, etc. In one embodiment, a user can utilize at least one I/O unit 140 to adjust/tune one or more tunable parameters, configure one or more pre-determined thresholds, provide user input, etc.

In one embodiment, the one or more applications on the electronic device 110 may further include one or more software mobile applications 170 loaded onto or downloaded to the electronic device 110, such as a camera application, a social media application, a video streaming application, etc. A software mobile application 170 on the electronic device 110 may exchange data with the system 200.

In one embodiment, the electronic device 110 comprises a communications unit 160 configured to exchange data with the display device 60. The communications unit 160 is further configured to exchange data with a remote computing environment 300 (e.g., receiving an image from the remote computing environment 300), over a communications network/connection 50 (e.g., a wireless connection such as a Wi-Fi connection or a cellular data connection, a wired connection, or a combination of the two). The communications unit 160 may comprise any suitable communications circuitry operative to connect to a communications network and to exchange communications operations and media between the electronic device 110 and other devices connected to the same communications network 50. The communications unit 160 may be operative to interface with a communications network using any suitable communications protocol such as, for example, Wi-Fi (e.g., an IEEE 802.11 protocol), Bluetooth®, high frequency systems (e.g., 900 MHZ, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 300 includes resources, such as one or more servers 310 and one or more storage units 320. One or more applications 330 that provide higher-level services may execute/operate on the remote computing environment 300 utilizing the resources of the remote computing environment 300.

In one embodiment, the remote computing environment 300 provides an online platform for hosting one or more online services (e.g., a video streaming service, etc.) and/or distributing one or more software mobile applications 170. As another example, the system 200 may be loaded onto or downloaded to the electronic device 110 from a remote computing environment 300 that maintains and distributes updates for the system 200. As yet another example, a remote computing environment 300 may comprise a cloud computing environment providing shared pools of configurable computing system resources and higher-level services.

Figure 2:
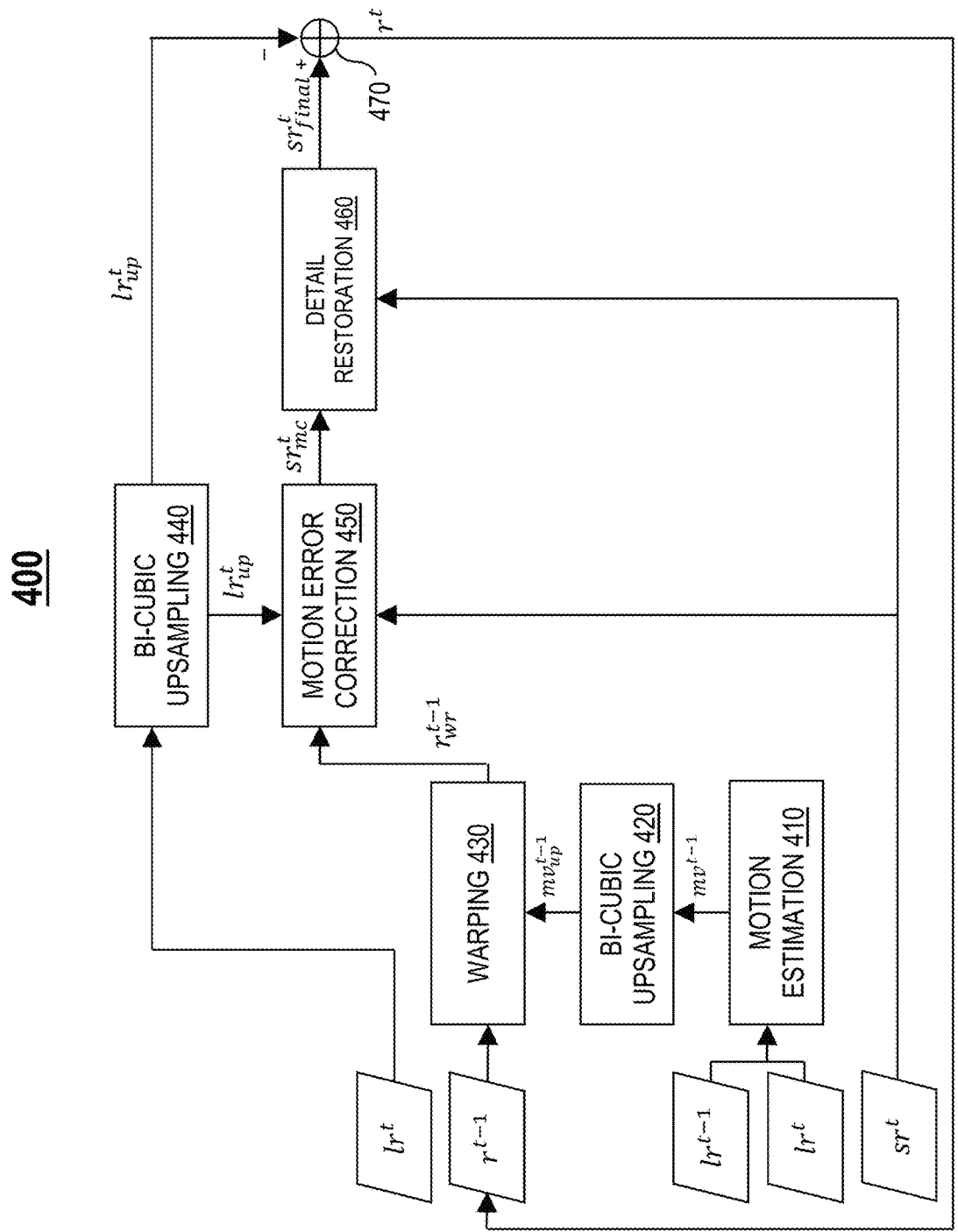
FIG. 2 illustrates an example detail restoration and flicker suppression system for implementing efficient flicker suppression for single image SR, in one or more embodiments.

FIG. 2 illustrates an example detail restoration and flicker suppression system 400 for implementing efficient flicker suppression for single image SR, in one or more embodiments. In one embodiment, one or more components of the system 400 is integrated into, or implemented as part of, the system 200 in FIG. 1.

Let t generally denote current time. Let lr$^t$ generally denote a LR frame (e.g., an SD image) of an input video, wherein the LR frame $lr^t$ occurs at current time t (i.e., $lr^t$ is a current LR frame). Let $sr^t$ generally denote a SR frame (e.g., a 4K image) of an input video, wherein the SR frame $sr^t$ occurs at current time t (i.e., $sr^t$ is a current SR frame), and the current SR frame $sr^t$ contains flicker. Let $r^{t-1}$ generally denote a residual frame of a previous frame of an input video (i.e., previous residual frame), wherein the previous frame occurs at previous time t−1.

In one embodiment, the system 400 comprises a motion estimation unit 410 configured to: (1) receive, as input, a current LR frame $lr^t$ of an input video, (2) receive, as input, a previous LR frame $lr^{t-1}$ of the input video, and (3) estimate one or more motion vectors $mv^{t-1}$ between the current LR frame $lr^t$ and the previous LR frame $lr^{t-1}$. In one embodiment, the motion estimation unit 410 estimates the one or more motion vectors $mv^{t-1}$ by applying any motion estimation method.

In one embodiment, the system 400 comprises a first bi-cubic upsampling unit 420 configured to: (1) receive, as inputs, one or more motion vectors $mv^{t-1}$ (e.g., from the motion estimation unit 410), and (2) upsample the one or more motion vectors $mv^{t-1}$ by applying bi-cubic upsampling, resulting in one or more upsampled motion vectors $mv_{up}^{t-1}$.

In one embodiment, the system 400 comprises a warping unit 430 configured to: (1) receive, as input, a previous residual frame $r^{t-1}$ of an input video, (2) receive, as input, one or more upsampled motion vectors $mv_{up}^{t-1}$ (e.g., from the first bi-cubic upsampling unit 420), and (3) warp the previous residual frame $r^{t-1}$ based on the one or more upsampled motion vectors $mv_{up}^{t-1}$, resulting in a warped previous residual frame $r_{wr}^{t-1}$ (i.e., motion-compensated previous residual frame).

In one embodiment, the system 400 comprises a second bi-cubic upsampling unit 440 configured to: (1) receive, as input, a current LR frame $lr^t$ of an input video, and (2) upsample the current LR frame $lr^t$ by applying bi-cubic upsampling, resulting in an upsampled current LR frame $lr_{up}^t$.

In one embodiment, the system 400 comprises a motion error correction unit 450 configured to: (1) receive, as input, an upsampled current LR frame $lr_{up}^t$ of an input video (e.g., from the second bi-cubic upsampling unit 440), (2) receive, as input, a warped previous residual frame $r_{wr}^{t-1}$ of the input video (e.g., from the warping unit 430), (3) receive, as input, a current SR frame $sr^t$ of the input video, and (4) apply motion error correction based on the upsampled current LR frame $lr_{up}^t$, the warped previous residual frame $r_{wr}^{t-1}$, and the current SR frame $sr^t$, resulting in a current SR frame $sr_{mc}^t$ where motion error is corrected ("motion error corrected current SR frame").

The motion error correction unit 450 prevents propagation of motion errors to current and next frames of the input video by checking for a mismatch between a flicker-free motion-compensated previous SR frame $sr'_{wr}^{t-1}$ and a current SR frame $sr^t$ with flicker. In one embodiment, the motion error correction unit 450 generates the motion-compensated previous SR frame $sr'_{wr}^{t-1}$ by applying motion compensation to the warped previous residual frame $r_{wr}^{t-1}$ and the upsampled current LR frame $lr_{up}^t$, in accordance with equation (1) provided below:

$$sr'_{wr}^{t-1} = lr_{up}^t + r_{wr}^{t-1} \qquad (1).$$

Motion estimated between a previous SR frame and the current SR frame may be inaccurate, resulting in the motion-compensated previous SR frame $sr'_{wr}^{t-1}$ not correctly matching the current SR frame $sr^t$. If a matching error (i.e., amount of mismatching) between the motion-compensated previous SR frame $sr'_{wr}^{t-1}$ and the current SR frame $sr^t$ is large (e.g., exceeds a pre-determined threshold) because of inaccurate motion estimation, the motion error correction unit 450 corrects the error by blending these two frames, resulting in the motion error corrected current SR frame $sr_{mc}^t$. As a result of the blending, some flickers of the current SR frame $sr^t$ are suppressed in the motion error corrected current SR frame $sr_{mc}^t$. As a result of the blending, some details of the current SR frame $sr^t$ may be lost in the motion error corrected current SR frame $sr_{mc}^t$. As described in detail later herein, any details lost as a result of the blending are restored via detail restoration.

In one embodiment, the motion error correction unit 450 generates a motion credibility map $M_{mv}^t$ representing the matching error, in accordance with equation (2) provided below:

$$M_{mv}^t[y,x] = \text{clip}(1 - \Sigma_{(i,j) \in w} \text{abs}(gsr^t[y+i,x+j]) - gsr'_{wr}^{t-1}[y+i,x+j]) \times s_{mv}, 0, 1) \qquad (2),$$

wherein $s_{mv}$ is a tunable parameter representing strength of motion error correction, $gsr^t$ is a grayscale of the current SR frame $sr^t$, and $gsr'_{wr}^{t-1}$ is a grayscale of the motion-compensated previous SR frame $sr'_{wr}^{t-1}$.

In one embodiment, the motion error correction unit 450 generates the motion error corrected current SR frame $sr_{mc}^t$, in accordance with equation (3) provided below:

$$sr_{mc}^t[y,x,c] = M'_{mv}^t[y,x] \cdot (lr_{up}^t[y,x,c] + r_{wr}^{t-1}[y,x,c]) + (1 - M_{mv}^t[y,x]) \cdot sr^t[y,x,c] \qquad (3),$$

wherein (x, y) is spatial coordinate of a pixel, and $c \in \{R, G, B\}$ is the $c^{th}$ color channel.

In one embodiment, the system 400 comprises a detail restoration unit 460 configured to: (1) receive, as input, a motion error corrected current SR frame $sr_{mc}^t$ of an input video (e.g., from the motion error correction unit 450), (2) receive, as input, a current SR frame $sr^t$ of the input video, and (3) apply detail restoration to restore some details of the current SR frame $sr^t$ that were lost in the motion error corrected current SR frame $sr_{mc}^t$, and apply flicker suppression to keep suppressed or further suppress some flickers of the current SR frame $sr^t$ in the motion error corrected current SR frame $sr_{mc}^t$, resulting in a final flicker-suppressed current SR frame $sr_{final}^t$. Compared to the motion error corrected current SR frame $sr_{mc}^t$, the final flicker-suppressed current SR frame $sr_{final}^t$ restores details of the current SR frame $sr^t$ while keeping suppressed or further suppressing flickers of the current SR frame $sr^t$. In one embodiment, the final flicker-suppressed current SR frame $sr_{final}^t$ is provided to a display (e.g., display device 60) for presentation.

Flickering can be separated from enhanced SR details in the frequency domain instead of the spatial domain. In one embodiment, the detail restoration unit 460 utilizes two-dimensional (2D) DCT for frequency decomposition to implement DCT-based detail restoration. In another embodiment, the detail restoration unit 460 utilizes another transform for frequency decomposition (i.e., frequency domain transformation), such as discrete sine transform (DST), or discrete Fourier transform (DFT).

In one embodiment, DCT-based detail restoration involves the detail restoration unit 460 dividing: (1) a grayscale $gsr_{mc}^t$ of the motion error corrected current SR frame $sr_{mc}^t$ into corresponding N×N blocks, and (2) a grayscale $gsr^t$ of the current SR frame $sr^t$ into corresponding N×N blocks. For example, in one embodiment, each grayscale $gsr_{mc}^t$, $gsr^t$ is divided into 8×8 blocks. Let $B_{(i,j)}(gsr_{mc}^t)$ generally denote an $(i, j)^{th}$ block of the grayscale $gsr_{mc}^t$. Let $B_{(i,j)}(gsr^t)$ generally denote an $(i, j)^{th}$ block of the grayscale $gsr^t$.

In one embodiment, DCT-based detail restoration further involves the detail restoration unit 460 applying a N×N 2D DCT to: (1) each block $B_{(i,j)}$ ($gsr_{mc}^t$) of the grayscale $gsr_{mc}^t$, and (2) each block $B_{(i,j)}$ ($gsr^t$) of the grayscale $gsr^t$.

Let $B_{(i,j,c)}$ ($sr_{mc}^t$) generally denote an (i, j)$^{th}$ block of the $c^{th}$ color channel of the motion error corrected current SR frame $sr_{mc}^t$. Let $B_{(i,j,c)}$ ($sr^t$) generally denote an (i, j)$^{th}$ block of the $c^{th}$ color channel of the current SR frame $sr^t$. In one embodiment, DCT-based detail restoration further involves the detail restoration unit 460 applying a N×N 2D DCT to: (1) each block $B_{(i,j,c)}$ ($sr_{mc}^t$) of the $c^{th}$ color channel of the motion error corrected current SR frame $sr_{mc}^t$, and (2) each block $B_{(i,j,c)}$($sr^t$) of the $c^{th}$ color channel of the current SR frame $sr^t$.

In one embodiment, DCT-based detail restoration further involves the detail restoration unit 460 computing a L1 norm distance $d_{(m,n)}$ and a blending weight $w_{(m,n)}$ between the (m, n)$^{th}$ frequency of DCT ($B_{(i,j)}$ ($gsr_{mc}^t$)) and DCT($B_{(i,j)}$($gsr^t$)), in accordance with equations (4)-(5) provided below:

$$d_{(m,n)}=|DCT_{(m,n)}(B_{(i,j)}(gsr_{mc}^t))-DCT_{(m,n)}(B_{(i,j)}(gsr^t))| \quad (4), \text{ and}$$

$$w_{(m,n)}=1-\text{clip}(d_{(m,n)}\cdot s_{dct},0,1) \quad (5),$$

wherein $s_{dct}$ is a tunable parameter representing strength of DCT based detail restoration. In one embodiment, a frequency band for flicker would have a lower weight, while a frequency band for details would have a higher weight.

In one embodiment, DCT-based detail restoration further involves the detail restoration unit 460 obtaining $DCT_{(m,n)}$ ($B_{(i,j,c)}$($sr_{final}^t$)) by blending $DCT_{(m,n)}(B_{(i,j,c)}(sr_{mc}^t))$ and $DCT_{(m,n)}(B_{(i,j,c)}(sr^t))$ using the blending weight $w_{(m,n)}$, in accordance with equation (6) provided below:

$$DCT_{(m,n)}(B_{(i,j,c)}(sr_{final}^t))=(1-w_{(m,n)})\cdot DCT_{(m,n)}(B_{(i,j,c)}(sr_{mc}^t))+w_{(m,n)}\cdot DCT_{(m,n)}(B_{(i,j,c)}(sr^t)) \quad (6).$$

In one embodiment, DCT-based detail restoration further involves the detail restoration unit 460 applying an inverse 2D DCT to $DCT_{(m,n)}(B_{(i,j,c)}(sr_{final}^t))$, and generating the final flicker-suppressed current SR frame $sr_{final}^t$.

In one embodiment, the system 400 comprises a combination unit 470 configured to: (1) receive, as input, an upsampled current LR frame $lr_{up}^t$ of an input video (e.g., from the second bi-cubic upsampling unit 440), (2) receive, as input, a final flicker-suppressed current SR frame $sr_{final}^t$ of the input video (e.g., from the detail restoration unit 460), and (3) generate a residual frame $r^t$ of a current frame of the input video (i.e., current residual frame) by subtracting the upsampled current LR frame $lr_{up}^t$ from the final flicker-suppressed current SR frame $sr_{final}^t$. The residual frame $r^t$ is provided as the previous residual frame $r^{t-1}$ at time t+1.

In one embodiment, the system 400 can adjust levels (i.e., amount or degree) of details to restore and/or levels (i.e., amount or degree) of flickers to suppress based on one or more tunable parameters of the system 400, such as $s_{mv}$ and $s_{dct}$.

Figure 3:
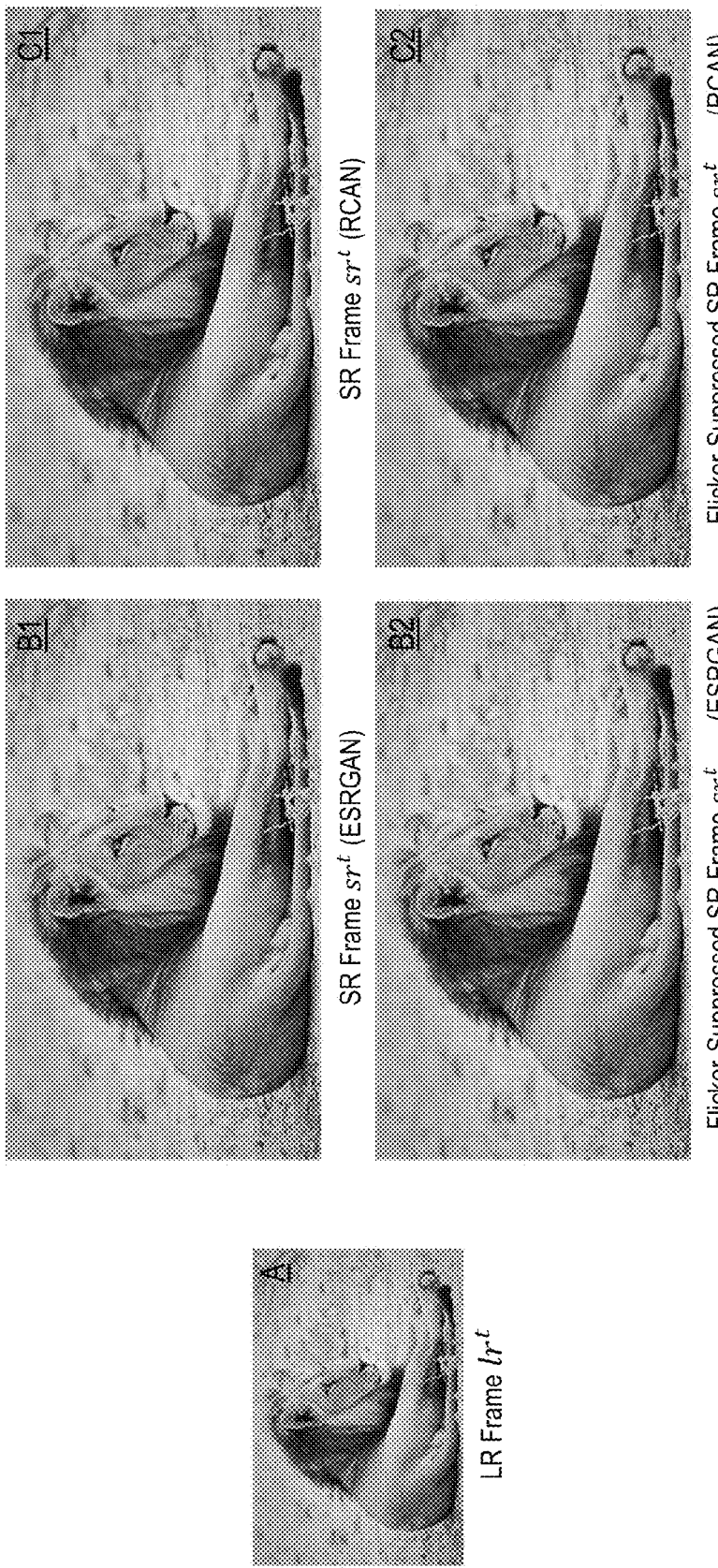
FIG. 3 illustrates a visual comparison between flicker-suppressed SR frames generated using different SR methods, in one or more embodiments.

FIG. 3 illustrates a visual comparison between flicker-suppressed SR frames generated using different SR methods, in one or more embodiments. In one embodiment, the flicker suppression system 400 works on any input video that has LR frames and corresponding SR frames generated using any SR method. Assume the system 400 receives an input video capturing a lion. As shown in FIG. 3, the input video has a current LR frame $lr^t$ labeled as A and a corresponding current SR frame $sr^t$ generated using any SR method. For example, the current SR frame $sr^t$ may comprise a SR frame generated using ESRGAN (Enhanced Super-Resolution Generative Adversarial Networks) and labeled as B1. As another example, the current SR frame $sr^t$ may comprise a SR frame generated using RCAN (Residual Channel Attention Networks) and labeled as C1.

If the current SR frame $sr^t$ comprises the SR frame B1, the system 400 generates a final flicker-suppressed current SR frame $sr_{final}^t$ labeled as B2. If the current SR frame $sr^t$ comprises the SR frame C1, the system 400 generates a final flicker-suppressed current SR frame $sr_{final}^t$ labeled as C2.

One or more parameters of the system 400, such as $s_{mv}$ and $s_{dct}$, may be adjusted/tuned if a final flicker-suppressed current SR frame $sr_{final}^t$ generated by the system 400 includes some flickering and/or some detail loss. Adjusting/tuning the one or more parameters of the system 400 removes the need to re-train the system 400 (and in turn, removing the need for large datasets/large amount of training samples required for such re-training).

Figure 4:
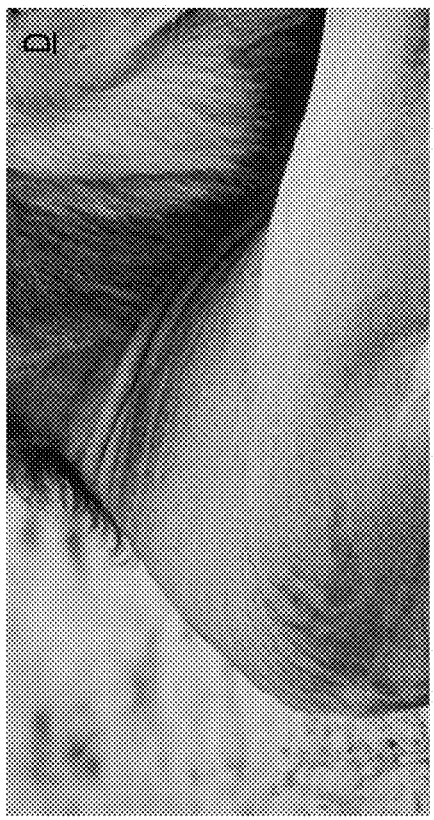
FIG. 4 illustrates a visual comparison between a SR frame without motion error correction and a SR frame with motion error correction, in one or more embodiments.
Figure 4:
Figure 4:
Figure 4:

FIG. 4 illustrates a visual comparison between a SR frame without motion error correction and a SR frame with motion error correction, in one or more embodiments. As shown in FIG. 4, in response to receiving the input video capturing the lion and having the current SR frame $sr^t$ labeled as E, the system 400 generates (e.g., via the second bi-cubic upsampling unit 440) an upsampled LR frame $lr_{up}^t$ labeled as D. In one embodiment, motion error correction may be turned off by adjusting/tuning the parameter $s_{mv}$ such that the system 400 bypasses motion error correction. If motion error correction is turned off, the system 400 generates a final flicker-suppressed current SR frame $sr_{final}^t$ without motion error correction labeled as F1. If motion error correction is not turned off, the system 400 generates (e.g., via the motion error correction unit 450) a final flicker-suppressed current SR frame $sr_{final}^t$ with motion error correction labeled as F2.

Visually, compared to the final flicker-suppressed current SR frame F2, the final flicker-suppressed current SR frame F1 has loss of fine details (e.g., details of edges and textures), ghosting artifacts, and less flicker suppression.

Figure 5:
FIG. 5 illustrates a visual comparison between a SR frame without discrete cosine transform (DCT)-based detail restoration and a SR frame with DCT-based detail restoration, in one or more embodiments.
Figure 5:

FIG. 5 illustrates a visual comparison between a SR frame without DCT-based detail restoration and a SR frame with DCT-based detail restoration, in one or more embodiments. In one embodiment, DCT-based detail restoration may be turned off by adjusting/tuning the parameter $s_{dct}$ such that the system 400 bypasses without DCT-based detail restoration. As shown in FIG. 5, in response to receiving the input video capturing the lion, the system 400 generates a final flicker-suppressed current SR frame $sr_{final}^t$. Specifically, if DCT-based detail restoration is turned off, the system 400 generates a final flicker-suppressed current SR frame $sr_{final}^t$ without DCT-based detail restoration labeled as G1. If DCT-based detail restoration is not turned off, the system 400 generates (e.g., via the detail restoration unit 460) a final flicker-suppressed current SR frame $sr_{final}^t$ with DCT-based detail restoration labeled as G2.

Visually, compared to the final flicker-suppressed current SR frame G2, the final flicker-suppressed current SR frame G1 has loss of fine details (e.g., details of edges and textures), ghosting artifacts, and less flicker suppression. The final flicker-suppressed current SR frame G2 has more fine details compared to the final flicker-suppressed current SR frame G1.

Figure 6:
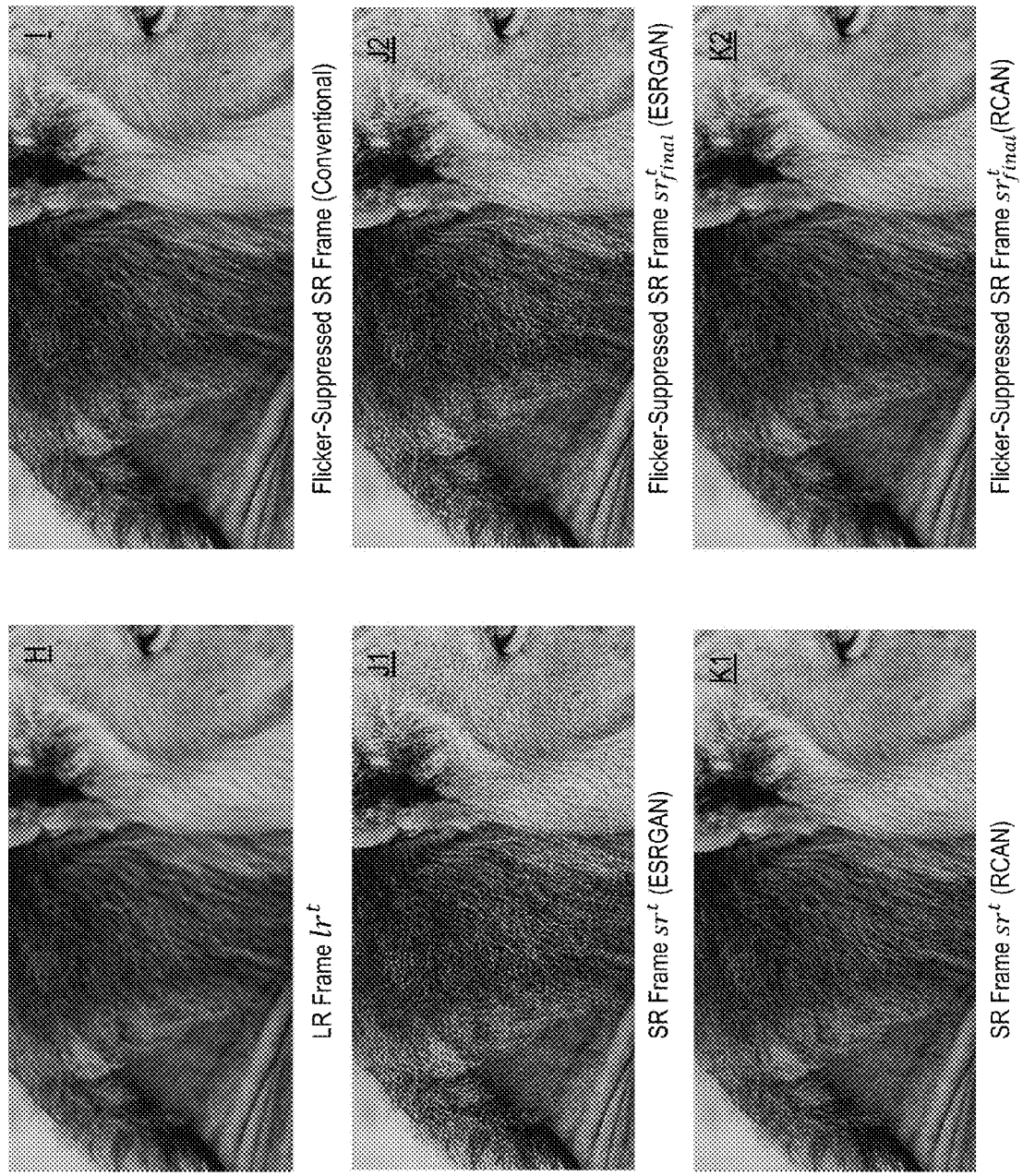
FIG. 6 illustrates a visual comparison between flicker suppression provided by a conventional flicker suppression method and flicker suppression provided by the system, in one or more embodiments.

FIG. 6 illustrates a visual comparison between flicker suppression provided by a conventional flicker suppression method and flicker suppression provided by the system 400, in one or more embodiments. Some conventional flicker suppression methods for SR include deep neural network based video SR. As shown in FIG. 6, the input video capturing the lion has a current LR frame $lr^t$ labeled as H and a corresponding current SR frame $sr^t$ generated using any SR method. For example, the current SR frame $sr^t$ may comprise a SR frame generated using ESRGAN and labeled as J1. As another example, the current SR frame $sr^t$ may comprise a SR frame generated using RCAN and labeled as K1.

If the current SR frame $sr^t$ comprises the SR frame J1, the system 400 generates a final flicker-suppressed current SR frame $sr_{final}^t$ labeled as J2. If the current SR frame $sr^t$ comprises the SR frame K1, the system 400 generates a final flicker-suppressed current SR frame $sr_{final}^t$ labeled as K2.

Visually, compared to the final flicker-suppressed current SR frame J2 or K2, a flicker-suppressed SR frame generated using a conventional flicker suppression method (e.g., deep neural network based video SR such as Temporally Coherent Generative Adversarial Networks (TecoGAN)) and labeled as I has loss of fine details (e.g., details of edges and textures), ghosting artifacts, and less flicker suppression. The final flicker-suppressed current SR frame J2 or K2 has more fine details compared to the flicker-suppressed SR frame I.

Figure 7:
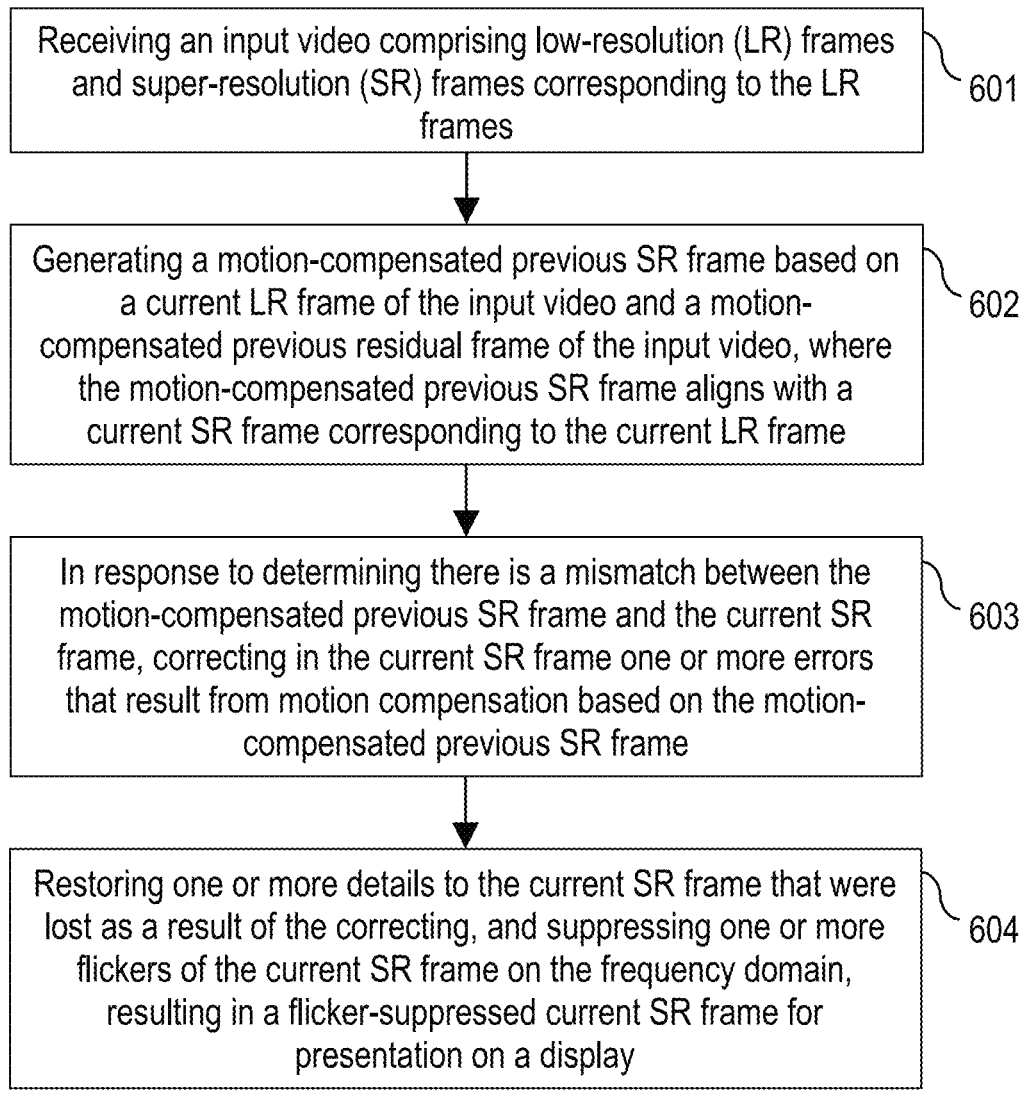
FIG. 7 is a flowchart of an example process for efficient flicker suppression for single image SR, in one or more embodiments.

FIG. 7 is a flowchart of an example process 600 for efficient flicker suppression for single image SR, in one or more embodiments. Process block 601 includes receiving an input video comprising LR frames and SR frames corresponding to the LR frames. Process block 602 includes generating a motion-compensated previous SR frame based on a current LR frame of the input video and a motion-compensated previous residual frame of the input video, wherein the motion-compensated previous SR frame aligns with a current SR frame corresponding to the current LR frame. Process block 603 includes, in response to determining there is a mismatch between the motion-compensated previous SR frame and the current SR frame, correcting in the current SR frame one or more errors that result from motion compensation based on the motion-compensated previous SR frame. Process block 604 includes restoring one or more details to the current SR frame that were lost as a result of the correcting, and suppressing one or more flickers of the current SR frame on the frequency domain, resulting in a flicker-suppressed current SR frame for presentation on a display.

In one embodiment, process blocks 601-604 may be performed by one or more components of the detail restoration and flicker suppression system 400.

Figure 8:
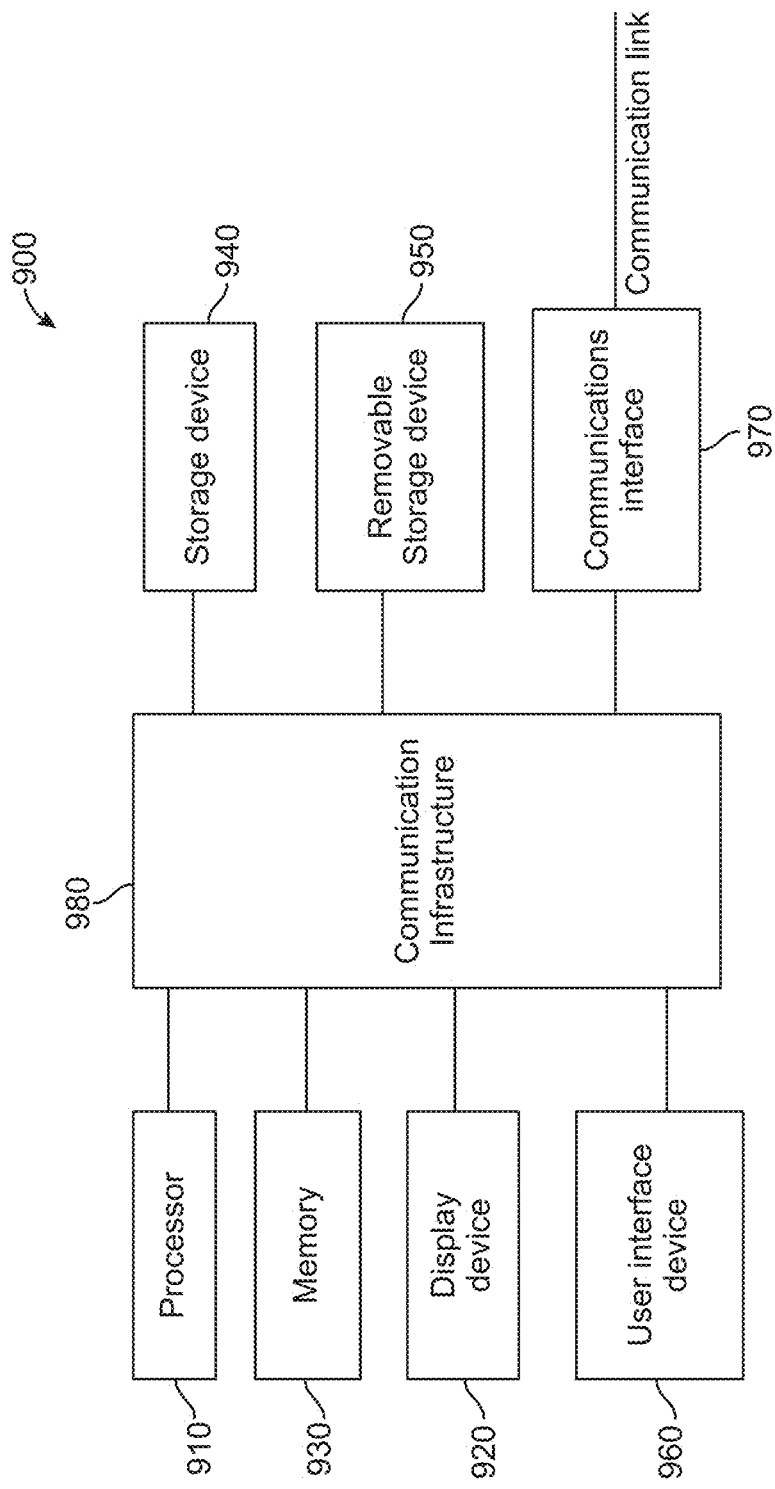
FIG. 8 is a high-level block diagram showing an information processing system comprising a computer system useful for implementing the disclosed embodiments.

FIG. 8 is a high-level block diagram showing an information processing system comprising a computer system 900 useful for implementing the disclosed embodiments. The systems 200 and/or 400 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electro-magnetic, optical, or other signals capable of being received by communications interface 970, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 600 (FIG. 7) may be stored as program instructions on the memory 930, storage device 940, and/or the removable storage device 950 for execution by the processor 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   receiving an input video comprising low-resolution (LR) frames and super-resolution (SR) frames corresponding to the LR frames;
   generating a motion-compensated previous SR frame based on a current LR frame of the input video and a motion-compensated previous residual frame of the input video, wherein the motion-compensated previous SR frame aligns with a current SR frame corresponding to the current LR frame, and the motion-compensated previous residual frame is obtained in part by subtracting a previous LR frame of the input video from a flicker-suppressed previous SR frame corresponding to the previous LR frame;

in response to determining there is a mismatch between the motion-compensated previous SR frame and the current SR frame, correcting in the current SR frame one or more errors that result from motion compensation based on the motion-compensated previous SR frame; and restoring one or more details to the current SR frame that were lost as a result of the correcting, and suppressing one or more flickers of the current SR frame on the frequency domain, resulting in a flicker-suppressed current SR frame for presentation on a display.

2. The method of claim 1, wherein the correcting comprises:

blending the motion-compensated previous SR frame and the current SR frame in response to determining the mismatch between the motion-compensated previous SR frame and the current SR frame exceeds a predetermined threshold.

3. The method of claim 1, wherein the correcting reduces propagation of the one or more errors to one or more subsequent SR frames of the input video.

4. The method of claim 1, wherein each of the restoring and the suppressing utilizes a two-dimensional (2D) transform for frequency decomposition.

5. The method of claim 4, wherein the 2D transform comprises one of discrete cosine transform (DCT), discrete sine transform (DST), or discrete Fourier transform (DFT).

6. The method of claim 1, further comprising:

adjusting a tunable parameter to adjust one of an amount of details to restore to the current SR frame or an amount of flickers of the current SR frame to suppress.

7. The method of claim 1, wherein the motion-compensated previous residual frame is further obtained based on a motion vector between the current LR frame and the previous LR frame.

8. A system comprising:

at least one processor; and a non-transitory processor-readable memory device storing instructions that when executed by the at least one processor causes the at least one processor to perform operations including:

receiving an input video comprising low-resolution (LR) frames and super-resolution (SR) frames corresponding to the LR frames;

generating a motion-compensated previous SR frame based on a current LR frame of the input video and a motion-compensated previous residual frame of the input video, wherein the motion-compensated previous SR frame aligns with a current SR frame corresponding to the current LR frame, and the motion-compensated previous residual frame is obtained in part by subtracting a previous LR frame of the input video from a flicker-suppressed previous SR frame corresponding to the previous LR frame;

in response to determining there is a mismatch between the motion-compensated previous SR frame and the current SR frame, correcting in the current SR frame one or more errors that result from motion compensation based on the motion-compensated previous SR frame; and restoring one or more details to the current SR frame that were lost as a result of the correcting, and suppressing one or more flickers of the current SR frame on the frequency domain, resulting in a flicker-suppressed current SR frame for presentation on a display.

9. The system of claim 8, wherein the correcting comprises:

blending the motion-compensated previous SR frame and the current SR frame in response to determining the mismatch between the motion-compensated previous SR frame and the current SR frame exceeds a predetermined threshold.

10. The system of claim 8, wherein the correcting reduces propagation of the one or more errors to one or more subsequent SR frames of the input video.

11. The system of claim 8, wherein each of the restoring and the suppressing utilizes a two-dimensional (2D) transform for frequency decomposition.

12. The system of claim 11, wherein the 2D transform comprises one of discrete cosine transform (DCT), discrete sine transform (DST), or discrete Fourier transform (DFT).

13. The system of claim 8, wherein the operations further comprise:

adjusting a tunable parameter to adjust one of an amount of details to restore to the current SR frame or an amount of flickers of the current SR frame to suppress.

14. The system of claim 8, wherein the motion-compensated previous residual frame is further obtained based on a motion vector between the current LR frame and the previous LR frame.

15. A non-transitory processor-readable medium that includes a program that when executed by a processor performs a method comprising:

receiving an input video comprising low-resolution (LR) frames and super-resolution (SR) frames corresponding to the LR frames;

generating a motion-compensated previous SR frame based on a current LR frame of the input video and a motion-compensated previous residual frame of the input video, wherein the motion-compensated previous SR frame aligns with a current SR frame corresponding to the current LR frame, and the motion-compensated previous residual frame is obtained in part by subtracting a previous LR frame of the input video from a flicker-suppressed previous SR frame corresponding to the previous LR frame;

in response to determining there is a mismatch between the motion-compensated previous SR frame and the current SR frame, correcting in the current SR frame one or more errors that result from motion compensation based on the motion-compensated previous SR frame; and restoring one or more details to the current SR frame that were lost as a result of the correcting, and suppressing one or more flickers of the current SR frame on the frequency domain, resulting in a flicker-suppressed current SR frame for presentation on a display.

16. The non-transitory processor-readable medium of claim 15, wherein the correcting comprises:

blending the motion-compensated previous SR frame and the current SR frame in response to determining the mismatch between the motion-compensated previous SR frame and the current SR frame exceeds a predetermined threshold.

17. The non-transitory processor-readable medium of claim 15, wherein the correcting reduces propagation of the one or more errors to one or more subsequent SR frames of the input video.

18. The non-transitory processor-readable medium of claim 15, wherein each of the restoring and the suppressing utilizes a two-dimensional (2D) transform for frequency decomposition.

19. The non-transitory processor-readable medium of claim 18, wherein the 2D transform comprises one of discrete cosine transform (DCT), discrete sine transform (DST), or discrete Fourier transform (DFT).

20. The non-transitory processor-readable medium of claim 15, the method further comprising:
   adjusting an amount of details to restore to the current SR frame by adjusting a first tunable parameter; and
   adjusting an amount of flickers of the current SR frame to suppress by adjusting a second tunable parameter.

* * * * *